Feb. 16, 1971 S. FESH 3,563,822
METHOD FOR WELDING THERMOPLASTIC PARTS BY SONIC ENERGY
Filed July 3, 1968

INVENTOR.
STEPHEN FESH
BY:
Erwin B. Steinberg

United States Patent Office 3,563,822
Patented Feb. 16, 1971

3,563,822
METHOD FOR WELDING THERMOPLASTIC PARTS BY SONIC ENERGY
Stephen Fesh, Danbury, Conn., assignor to Branson Instruments, Incorporated, Stamford, Conn., a corporation of Delaware
Filed July 3, 1968, Ser. No. 742,312
Int. Cl. B29c 27/08
U.S. Cl. 156—73             11 Claims

ABSTRACT OF THE DISCLOSURE

Welding two superposed thermoplastic members is accomplished by providing a sonically or ultrasonically vibrating horn and forcing its frontal surface into one of the members toward the interface between both members. Responsive to the dissipation of sonic energy, thermoplastic material softens and flows at the interface, bonding both members together at the location of horn penetration.

---

This invention refers to a method for welding together thermoplastic parts and more specifically has reference to a method for welding together two superposed, relatively rigid, thermoplastic parts by sonic energy whereby sonic energy is applied to the parts from one side.

The welding together of thermoplastic parts by means of sonic or ultrasonic energy is well known in the art and is shown, for instance, in U.S. Pat. No. 2,633,894 issued to P. B. Carwile, entitled "Plastic Welding," dated Apr. 7, 1953 and in U.S. Pat. No. 3,224,916 issued to R. S. Soloff et al., dated Dec. 21, 1965, entitled "Sonic Method of Welding Thermoplastic Parts." The welding together of two superposed, relatively rigid and thick thermoplastic parts which contact each other along an extended surface or plane presents, however, considerable difficulties. The ultrasonic energy applied to one part diffuses and spreads over a relatively large area and fails to soften the material at the interface, that is, the surface or plane along which both parts are in contact with one another. In order to overcome this problem it has been recommended to use, what has become known as, "energy directors" on one of the parts. Energy directors are projections which project from the contact surface of one of the parts and thus form a reduced cross-sectional area at which sonic energy is dissipated. The projections provide rapidly softened thermoplastic material which flows and produces a bond upon solidification. These energy directors are similar to projections used in electrical resistance welding where one of the parts is provided with one or more projections to interpose a high resistance electrical contact area in which a quick buildup of heat occurs.

In many instances it is necessary to weld members of considerable thickness together and energy directors are either not present or cannot be included in the design when initially conceived. In other instances, it is desirable to weld together thermoplastic parts which meet along an extended surface, such configuration making it difficult to direct and control the dissipation of sonic energy.

The method disclosed hereafter provides an arrangement wherein it is possible to joint by sonic or ultrasonic energy relatively thick structural thermoplastic parts which are superposed on one another and such parts meet over an extended surface area in such a way that, using the heretofore known techniques, the direction of sonic energy flow is not readily controllable. In the preferred method, when both thermoplastic members are superposed upon one another, one of the members is engaged with a sonically vibrating tool and the tool is urged into said one member, causing the tool to penetrate such member until the front end of the tool is disposed in proximity to the interface between both members. Responsive to the dissipation of sonic energy, molten thermoplastic materal flows along the interface at the location of penetration by the tool and such molten material, upon hardening cases said members to be bonded together.

One of the principal objects of this invention is, therefore, a method for bonding two thermoplastic members to each other by sonic energy.

Another important object of this invention is the provision of a method for sealing together by sonic energy two substantially rigid thermoplastic members which are superposed along an extended interface surface.

A further object of this invention is the provision of a new method for sealing together by ultrasonic energy two superposed structural members, applying sonic energy to one of the members and penetrating said member with a sonic tool until the front end of the tool is disposed in the vicinity of the inter face between the two superposed members and then terminating sonic energy transfer.

Further and other objects of this invention will be more clearly apparent by reference to the drawings, in which.

Figure 1:
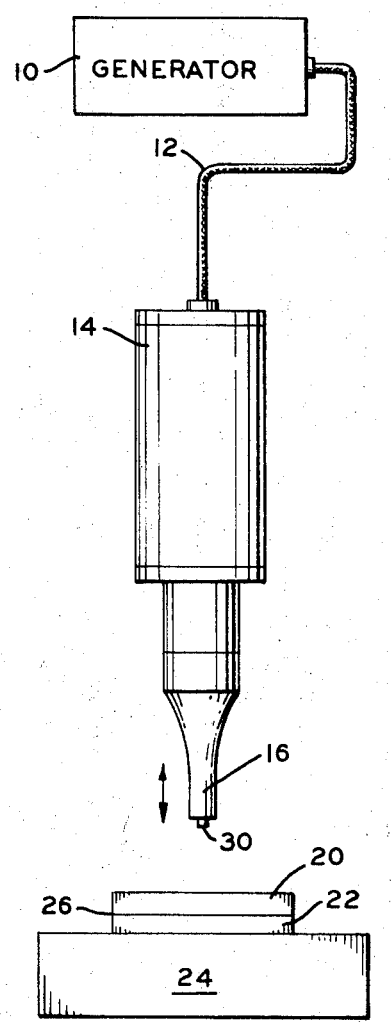
FIG. 1 is a schematic illustration of the ultrasonic apparatus and the thermoplastic members before sealing.

Referring now to the figures and FIG. 1 in particular, numeral 10 identifies an electrical high frequency generator which applies via a cable 12 electrical energy to a sonic energy converter 14 producing sonic vibrations. The converter 14 is fitted with a mechanical amplitude transformer 16, also known as a solid horn, made of metallic material, such as aluminum or titanium. The generator 10, cable 12, and converter 14 form a commercial unit which is available, for instance, as Model J-32 from the Branson Sonic Power Company, Danbury, Conn. The converter 14 in the model above includes a piezoelectric disk (not shown) which converts the electrical energy supplied from the generator 10 to sonic energy, the amplitude of the mechanical oscillations being amplified by the horn 16 which is coupled by mechanical means to the piezoelectric disk, see for instance, U.S. Pat. No. 3,328,610 issued to S. E. Jacke et al., entitled "Sonic Wave Generator," dated June 27, 1967. Similar units, also commercially available, use magnetostrictive transducing means in order to convert the electrical energy received to sonic energy and both types of converters generally operate at a frequency in the order of 18 to 25 kHz., but it will be understood by those skilled in the art that the precise frequency is not critical. In order to maintain the noise at a tolerable level, it is generally desirable that these sonic energy units operate in the ultrasonic frequency range, i.e., at a frequency of 16 kHz. or higher. The length of the horn 16 is adjusted to cause it to operate as a half wavelength resonator at the operating frequency, the frontal surface 30 of the horn being located at an antinode and oscillating along the longitudinal axis of the horn as shown by the arrow.

Below the horn 16 there is shown a flat first thermoplastic member 20 which is superposed on a second thermoplastic member 22 whose underside rests on a support 24. The thermoplastic members, typically relatively rigid structural pieces made of ABS plastics material, meet along an interface surface 26.

Figure 2:
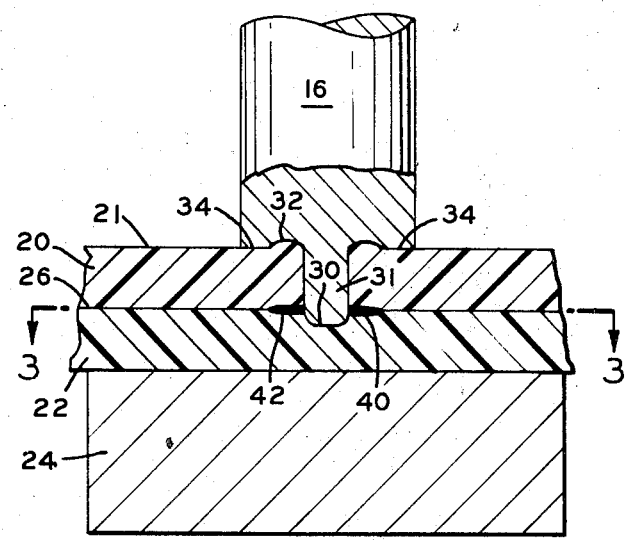
FIG. 2 is an illustration of one of the embodiments of the method for sealing together both members by sonic energy.

FIG. 2 shows one embodiment of the process for bonding both members 20 and 22 together. The process comprises engaging the surface 21 of the member 20 and penetrating the member 20 with the sonically vibrating horn 16 until at least the interface 26 is reached. The front portion 31 of the horn has a frontal surface 30 which is shaped to be relatively blunt, having a radius, to facilitate the penetration of the members when applying the vibrating horn 16 to the exposed surface 21 of the thermoplastic member 20. Other frontal surfaces successfully tested are of conical and frustoconical shape.

Responsive to the horn 16, resonating at its designed frequency, being urged into the surface of the thermoplastic member 20 and the attendant dissipation of sonic energy, thermoplastic material in contact with the horn portion 31 softens and some of this material flows upward and is shaped and retained by an annular radially disposed recess 32 of the horn. As the horn tip 30 penetrates deeper into the material and reaches the interface 26, additional friction is produced. Softened thermoplastic material is generated not only at the interface surrounding the horn, but softened material leaks into the interface as shown by numerals 40 and 42. Upon the cessation of sonic energy, this softened material quickly hardens and thereby welds the thermoplastic members 20 and 22 together, similar to a spot weld or a rivet type fastening. The flat radial surface 34 of the horn aids in providing the engagement pressure for holding the members 20 and 22 in intimate contact along the interface 26 after the cessation of sonic energy. This short period is the "hold" time during which the softened material is permitted to harden.

Figure 3:
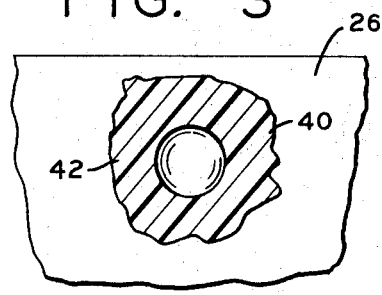
FIG. 3 is a plan view along line 3—3 of FIG. 2.

FIG. 3 is a plan view taken at the interface surface 26, showing the fused or molten thermoplastic material at the interface.

Figure 4:
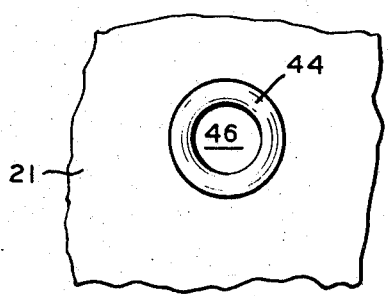
FIG. 4 is a top plan view of the surface engaged by the sonically vibrating tool after completion of the welding process.

FIG. 4 is a plan view of the surface 21, showing the annular bead 44 of thermoplastic material produced by material retained nad shaped within the recess 32 of the horn 16 and showing, moreover, the blind hole 46 produced by the front portion 31 of the horn 16.

When welding large sections the process described hereinabove is repeated at regular increments, such as at spaces one inch apart, in order to provide a sufficient quantity of "spot welds."

It will be noted that the length of the front portion 31 of the horn 16 from the tip 30 to the surface 34 is adjusted to equal the thickness of horn penetration desired, in this embodiment slightly exceeding the thickness of the member 20.

In another embodiment of the present method it was determined that the frontal portion 30 of the horn was not required to penetrate to or beyond the interface 26. The front surface of the horn was stopped in member 20 short of reaching the interface 26, yet a sufficient amount of heat was developed by the dissipation of sonic energy at the horn's frontal surface to cause fusing of thermoplastic material at the interface 26. Thus, it is apparent that the horn is not actually required to penetrate through the interface into the underlying member, but when providing sufficient sonic energy, the horn can be urged into the one member until the horn's frontal surface is located in proximity to the interface along which both thermoplastic members meet.

While in some instances it may be desired to actually penetrate with the horn frontal surface beyond the interface 26, it may be advantageous in other instances to penetrate through the member 20 until the frontal surface 30 is disposed exactly at the interface 26 or at a location somewhat short of the interface 26. Experimental test pieces will provide the most desirable condition and such test pieces can be run before actual production items are used. The horn 16 is then dimensioned to that the surface 34 provides a convenient stop for the horn penetration in the member 20 or members 20 and 22.

While there has been described and illustrated a new method for sealing together two thermoplastic members by sonic or ultrasonic energy and certain modifications have been indicated, it will be apparent to those skilled in the art that still further changes and modifications may be made without deviating from the broad principle and intent of this invention.

What is claimed it:

1. A method for bonding together two relatively rigid thermoplastic members which are superposed upon one another along a common interface, leaving each such member with an exposed side comprising the steps of:
   engaging one of the thermoplastic members at its exposed side with a sonically vibrating tool;
   urging said tool into said one member and penetrating said member until the frontal surface of said tool is disposed in proximity to said interface,
   whereby to cause responsive to the dissipation of sonic energy molten thermoplastic material to flow at said interface at a location in proximity to the penetration of said tool, and said molten material upon hardening causing said members to be bonded together at such location.

2. A method for bonding together two thermoplastic members as set forth in claim 1, and penetrating said one member at least until the frontal surface of said tool is disposed at said interface.

3. A method for bonding together two thermoplastic members as set forth in claim 1, and penetrating said one member until the frontal surface of said tool is disposed in proximity to but short of said interface.

4. A method for bonding together two thermoplastic members as set forth in claim 1, and penetrating said one member until the frontal surface of said tool is disposed in said other member.

5. A method for bonding together two thermoplastic members as set forth in claim 1, and supporting the other one of said thermoplastic members at its exposed side.

6. A method for bonding together two thermoplastic members as set forth in claim 1, said tool being a solid acoustic horn.

7. A method for bonding together two thermoplastic members as set forth in claim 6, said horn when engaging said one member resonating along its longitudinal axis.

8. A method for bonding together two thermoplastic members as set forth in claim 7, said horn having a front end which is shaped to provide a blind hole when penetrating said member.

9. A method for bonding together two thermoplastic members as set forth in claim 1, said tool vibrating at a frequency of at least 10 kHz.

10. A method for bonding together two relatively rigid thermoplastic members which are superposed upon one another along a common interface, comprising the steps:
    engaging one of the thermoplastic members at its exposed side with an ultrasonically vibrating horn coupled to a sonic energy transducer;
    urging said horn into said one member in a direction toward the other member whereby to penetrate said one member and stopping such penetration when the frontal surface of said horn is disposed within said one member at least in proximity to the interface between said members;
    temporarily retaining said horn in its penetrated position while the horn is stopped from vibrating, and
    withdrawing the horn from said one member, whereby responsive to the vibrations of the horn and the penetration thereof into said one member thermoplastic material is softened which flows at said interface in proximity to the frontal surface of the horn, and such material hardens upon said horn being stopped from vibrating, thereby bonding both members to each other at such location.

11. A method for bonding together two relatively rigid thermoplastic members which are superposed upon one another along a common interface surface, comprising the steps:
    engaging one of the thermoplastic members at its exposed side with an ultrasonically resonating horn, the frontal surface of the horn being disposed substantially at an antinode of the resonating horn;

urging the frontal surface of said horn into said one member in a direction toward said interface surface whereby the dissipation of sonic energy causes a softening and flowing of thermoplastic material at the area of contact between said horn and member;

stopping the penetration of said horn when said horn is disposed within said member and softened material is caused to flow at said interface surface between said members;

temporarily retaining said horn in its penetrated position while stopping the vibrations applied to the horn for causing the softened and flowed material to harden and provide a bond between said member at said interface surface, and withdrawing the horn from engagement with said member.

References Cited
UNITED STATES PATENTS

| | | | |
|---|---|---|---|
| 3,146,141 | 8/1964 | Woodland | 156—73 |
| 3,419,447 | 12/1968 | Hewitt | 156—73 |

CARL D. QUARFORTH, Primary Examiner

A. J. STEINER, Assistant Examiner

U.S. Cl. X.R.

29—470.3